(12) United States Patent
Nackers et al.

(10) Patent No.: US 8,795,133 B2
(45) Date of Patent: Aug. 5, 2014

(54) EVENT-BASED RETARDING IN A MACHINE WITH A CONTINUOUSLY VARIABLE TRANSMISSION

(71) Applicant: Caterpillar Inc., Peoria, IL (US)

(72) Inventors: Adam Nackers, East Peoria, IL (US); Kevin Davis, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 84 days.

(21) Appl. No.: 13/666,577

(22) Filed: Nov. 1, 2012

(65) Prior Publication Data

US 2014/0121058 A1 May 1, 2014

(51) Int. Cl.
*F16H 61/40* (2010.01)

(52) U.S. Cl.
USPC .......................................................... 477/68

(58) Field of Classification Search
None
See application file for complete search history.

(56) References Cited

U.S. PATENT DOCUMENTS

| | | | |
|---|---|---|---|
| 4,056,176 A | 11/1977 | Förster et al. | |
| 5,154,267 A | 10/1992 | Watts | |
| 5,389,051 A | 2/1995 | Hirate et al. | |
| 5,526,261 A | 6/1996 | Kallis et al. | |
| 6,212,458 B1 * | 4/2001 | Walenty et al. | 701/51 |
| 6,217,477 B1 | 4/2001 | Nobumoto et al. | |
| 6,223,592 B1 | 5/2001 | Genise | |
| 6,240,356 B1 | 5/2001 | Lapke | |
| 6,246,940 B1 * | 6/2001 | Ochiai et al. | 701/51 |
| 6,249,733 B1 * | 6/2001 | Smith | 701/50 |
| 6,347,680 B1 | 2/2002 | Mianzo et al. | |
| 6,385,970 B1 | 5/2002 | Kuras et al. | |
| 6,388,407 B1 | 5/2002 | Eguchi | |
| 6,474,186 B1 | 11/2002 | Vollmar | |
| 6,519,937 B2 * | 2/2003 | Nanri et al. | 60/327 |
| 6,817,338 B2 | 11/2004 | Janic et al. | |
| 7,192,374 B2 | 3/2007 | Kuras et al. | |
| 7,296,496 B2 * | 11/2007 | Shah | 74/733.1 |
| 7,400,964 B2 | 7/2008 | Shiiba et al. | |
| 7,401,542 B2 | 7/2008 | Stephens et al. | |
| 7,641,588 B2 * | 1/2010 | Thomson et al. | 477/108 |
| 7,669,580 B2 | 3/2010 | Silbernagel et al. | |
| 7,672,771 B2 * | 3/2010 | Nakanishi et al. | 701/70 |
| 7,739,021 B2 * | 6/2010 | Wegeng et al. | 701/70 |
| 7,762,923 B2 | 7/2010 | Schuh et al. | |
| 7,894,968 B2 | 2/2011 | Stroh et al. | |
| 7,972,240 B2 | 7/2011 | Janasek | |
| 8,070,651 B2 | 12/2011 | Eastman et al. | |
| 8,216,109 B2 | 7/2012 | Dahl et al. | |

(Continued)

FOREIGN PATENT DOCUMENTS

| EP | 1640640 A1 | 3/2006 |
|---|---|---|
| JP | 01-244930 A | 9/1989 |
| JP | 2010-078089 A | 4/2010 |

*Primary Examiner* — Dirk Wright
(74) *Attorney, Agent, or Firm* — Leydig, Voit & Mayer (57) ABSTRACT

A method controls the power-transmission in a machine having a continuously variable transmission (CVT) and a power source operatively coupled together in a powertrain. The method regulates operation of the CVT with a retarding power limit in order to limit the amount of retarding power transferable from the powertrain to the power source. The retarding power may be utilized to decelerate or decrease the speed of the machine. The method may register an operator input signal indicative of a deceleration event from a plurality of possible deceleration events. The deceleration event is compared to a lookup table to determine if the retarding power limit should be adjusted. The method may adjust the retarding power limit in accordance with the comparison.

20 Claims, 5 Drawing Sheets

(56) References Cited

U.S. PATENT DOCUMENTS

| | | |
|---|---|---|
| 8,545,368 B1 * | 10/2013 | Davis et al. .................... 477/40 |
| 8,585,543 B1 * | 11/2013 | Davis et al. .................... 477/43 |
| 2008/0172162 A1 | 7/2008 | Wegeng et al. |
| 2009/0088936 A1 | 4/2009 | Hubbard et al. |
| 2009/0112424 A1 | 4/2009 | Dahl et al. |
| 2010/0137102 A1 | 6/2010 | Sopko, Jr. et al. |
| 2011/0088961 A1 | 4/2011 | Case et al. |
| 2011/0301793 A1 | 12/2011 | Hsieh et al. |
| 2012/0083976 A1 | 4/2012 | Fleming et al. |
| 2012/0136548 A1 | 5/2012 | Hoff |

* cited by examiner

| EVENT LIMIT 254 / 252 | THROTTLE RELEASE 260 | GEAR SHIFT 262 | DIRECTION CHANGE 264 |
|---|---|---|---|
| 500 N-m (270) | X | | |
| 750 N-m (274) | | X | |
| 1000 N-m (272) | | | X |

EVENT-BASED RETARDING IN A MACHINE WITH A CONTINUOUSLY VARIABLE TRANSMISSION

TECHNICAL FIELD

The present disclosure relates generally to a machine equipped with a continuously variable transmission (CVT) coupled to a power source and, more particularly, to a CVT adapted to direct a retarding power to the power source.

BACKGROUND

Many machines use transmissions to couple the output of a prime mover or power source, for example, an internal combustion engine, to a driven element or device such as wheels or a work implement. Traditional transmissions typically included one or more fixed, selectably engageable gear ratios that could increase or decrease the speed of the prime mover and, usually in an inverse relationship, the torque that is output to the driven element. Recently, however, some manufacturers have equipped certain machines with continuously variable transmissions (CVTs) instead of the conventional, gear-based transmissions. A CVT provides an infinite or continuous range of torque-to-speed output ratios with respect to any given input from the prime mover. In other words, the output of the CVT can be increased or decreased across a continuous range in almost infinitesimally small increments. In some embodiments, to improve operator recognition and familiarity, the CVT may be regulated according to a virtual gear methodology that simulates a plurality of virtual gear ratios resembling the actual gear ratios in conventional transmissions.

In some machines, CVTs may function to transmit a retarding power back to the prime mover to slow or limit the machine's propulsion. For example, if a machine is traveling on a declining plane or surface, it may be desirable to redirect some of the output from the CVT that normally is transmitted to the driven elements instead back to the prime mover. The redirected power may be referred to as a retarding power, i.e., power obtained from the machine's driven elements and directed back to the power source where the retarding power may act as a counterpoise. In some instances, the retarding power is harnessed from the momentum or potential energy stored or generated by the driven elements. Because the driven elements, e.g., wheels, have less power directed to them and may be losing power during retarding, their rotation may slow due to the effects of inertia and friction with the ground, allowing the machine to maintain speed on downward slopes or, in some instances, decelerate.

One method for retarding a power source is described in U.S. Patent Publication No. 2010/0137102 (the '102 publication), titled "Retarding Control for a Machine" and assigned to the assignee of the present application. The '102 publication describes a methodology that monitors one or more operator inputs to determine a desired machine speed and compares the desired machine speed with the actual speed of the machine to determine if retarding is necessary. The '102 publication describes that the amount of retarding generated may be determined in part by the difference between the desired speed and the actual speed. The '102 publication may thus be considered a speed-based retarding control.

SUMMARY

In an aspect, the disclosure describes a method of controlling the speed of a machine that has a continuously variable transmission (CVT) and a power source operatively coupled together in a powertrain. The method regulates operation of the CVT with a retarding power limit that limits the amount of retarding power transferable from the powertrain to the power source. The method may register an operator input signal indicative of a deceleration event or a commanded decrease in the speed of the machine. The deceleration event is compared to a lookup table to determine if the retarding power limit should be adjusted. The method may then adjust the retarding power limit in accordance with the comparison.

In another aspect, the disclosure describes a machine with a power source operatively coupled to a CVT. The machine also includes an operator input device for registering an operator input signal indicative of a deceleration event. Further, the machine includes a controller communicating with the CVT and the operator input device. The controller may include information regarding a first retarding power limit and a second retarding power limit limiting a retarding power directed by the CVT to the power source. The controller may also include a lookup table for selecting either the first retarding power limit or the second retarding power limit based on the deceleration event.

In a further aspect, the disclosure describes a method of controlling the speed of a machine having a power source and a CVT operatively coupled in a powertrain. The method controls operation of the powertrain by selective use of a first retarding power limit, a second retarding power limit, and a third retarding power limit. The retarding power limits may limit transmission of a retarding power in the powertrain. The method may register the release of a machine speed control input device and may select and apply the first retarding power limit in order to limit transmission of the retarding power.

DETAILED DESCRIPTION

This disclosure relates to a machine equipped with a continuously variable transmission (CVT) to operatively couple and transfer mechanical power from a prime mover power source to a driven element. CVTs may sometimes be referred to as infinitely variable transmissions (IVTs), however, the disclosure relates to both transmissions and any similar type of transmission regardless of nomenclature. Now referring to FIG. 1, wherein like reference numbers refer to like elements, there is illustrated an embodiment of a machine 100, and, in particular, a motor grader designed in accordance with the present disclosure. However, the present disclosure is applicable to other types of machines and applications in addition to motor graders. As used herein, the term "machine" may refer to any type machine that performs some operation associated with an industry such as mining, construction, farming, transportation, or any other industry known in the art. For example, the machine may be an earth-moving machine, such as a wheel loader, excavator, dump truck, backhoe, excavator, material handler or the machine may be another type of working machine such as a compactors, pavers, etc. Moreover, an implement may be connected to the machine. Such implements can be utilized for a variety of tasks, including, for example, loading, compacting, lifting, brushing, and include, for example, buckets, compactors, fork lifting devices, brushes, grapples, cutters, shears, blades, breakers/hammers, augers, and others. Additionally, the machine can be used in the transportation field such as on-highway trucks, cargo vans, or the like.

Figure 1:
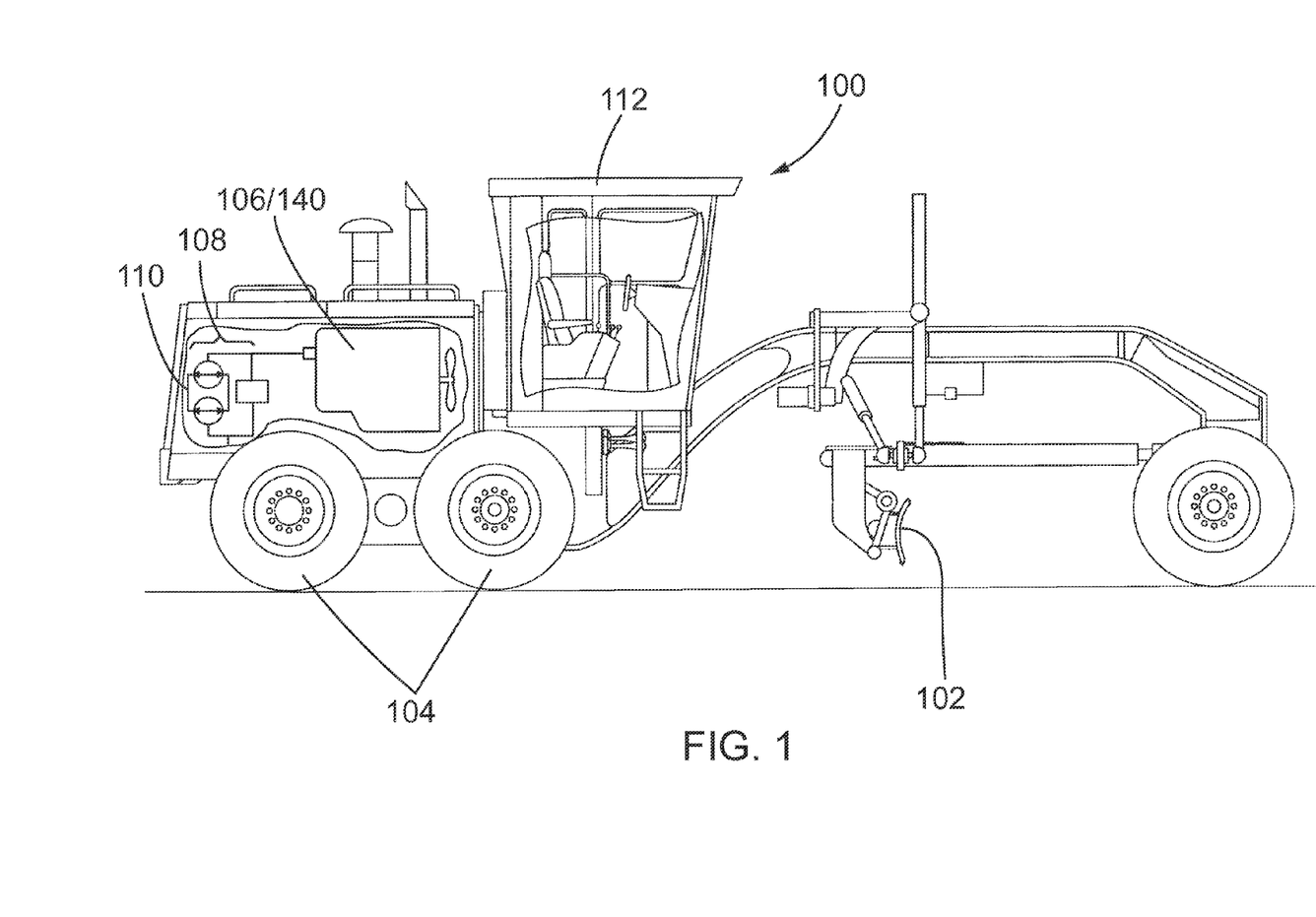
FIG. 1 is a diagrammatical, side elevational view of a mobile machine having a prime mover power source coupled to a driven element through an intermediate CVT.

The illustrated machine 100 may be capable of alternating between high-speed, over-the-road travel and heavy, load-engaging operation. For example, the machine 100 can include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of the propulsion device may be power-driven to rotate and/or another set may be steerable by an operator onboard, remotely, or by another control scheme.

Power for driving the propulsion devices and/or the attached implement can be provided by a power source 106, sometimes referred to as a prime mover, that is disposed on the machine. A suitable example of a power source 106 is an internal combustion engine, such as a compression ignition diesel engine, that burns a hydrocarbon-based fuel or another combustible fuel source to convert the potential or chemical energy therein to mechanical power that may be utilized for other work. Other suitable types of power sources 106 may include spark-ignition gasoline engines, turbines, hybrid engines, solar powered engines, and the like. To transfer the mechanical power produced by the power source 106 to the propulsion devices 104, the machine 100 can include a powertrain 108 operatively coupling the power source and the propulsion devices. To adjust the speed and/or torque output of the power source, a CVT 110 may be disposed intermediately in the powertrain 108. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power-actuated blade 102.

Figure 2:
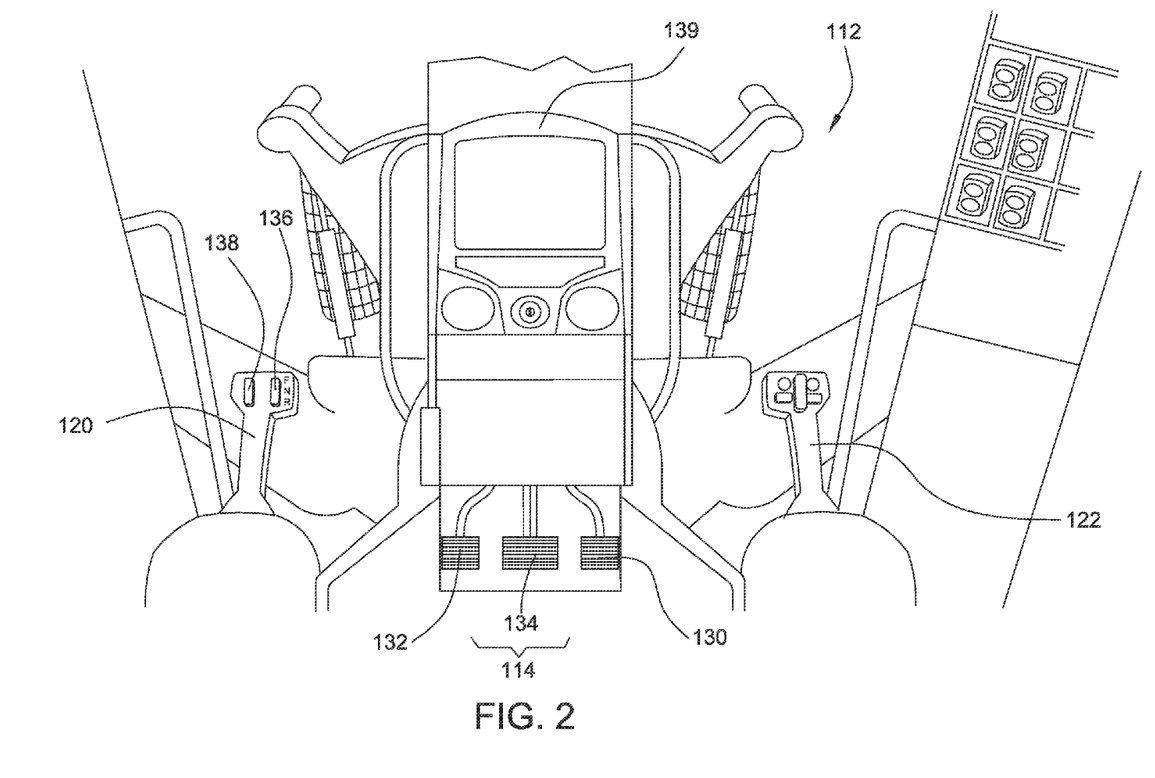
FIG. 2 is a fragmentary perspective view taken from an operator's chair in an operator station for the machine including various accessible, operator-actuated controls and inputs for operating the machine.

To direct operation of the machine 100, an operator station 112 configured to accommodate an operator may be disposed on the machine or remotely in a location that allows visual command over the operating environment. Referring to FIG. 2, various controls and/or inputs 114 with which the operator may interact to maneuver and operate the machine 100 may be accessible inside the operator station 112. The controls and/or inputs illustrated in FIG. 2 are provided by way of example only and may include different arrangements in different embodiments. For example, to steer or control the direction of the machine, a first control column or joystick 120 and a second joystick 122 may be disposed to either side of the operator station 112. The operator may grasp and manipulate the joysticks 120, 122 to adjust operation of the machine or its implements. For example, the first joystick 120 may control steering and the second joystick 122 may control an implement. In other embodiments, a steering wheel or other suitable type of control may be included.

In the illustrated embodiment, the controls may include one or more articulating pedals located toward the floor that an operator may modulate by depressing or releasing with his feet. For example, to control or adjust the speed or propulsion of the machine, the pedals may include a first pedal 130 oriented toward the right of the operator station 112 that may function as a throttle pedal. Specifically, by depressing the first pedal 130, the operator may command a speed increase or acceleration of the machine. Likewise, releasing the first pedal 130 may indicate a desire to decelerate speed down to a predetermined minimum or idle speed. The first pedal 130 is therefore a form of a machine speed control device. In other embodiments, controls or inputs other than a pedal, such as levers or the like, may be used to adjust the speed of the machine and may be considered speed control throttles.

A second pedal 132 oriented to the left of the operator station 112 may affect the transmission rate of power through the powertrain in a manner that simulates a clutch. Specifically, articulating the second pedal 132 may cause more or less of the power output from the power source to dissipate in the powertrain or related components thereby reducing the transmission efficiency in a manner that simulates slipping of a clutch. For example, fully depressing the second pedal 132 may adjust the powertrain so that the power source is disengaged from the propulsion devices and the machine is effectively in neutral. The second pedal 132 is therefore a form of a clutch control device. A center-oriented third pedal 134 may be disposed between the first and second pedals 130, 132 and may activate or simulate a brake to stop the machine. The brake may be similar to a friction brake that physically engages the propulsion devices 104 to slow their rotation or the brake may be similar to an engine brake that limits the efficiency of power source. In various embodiments, the third pedal may also be considered a machine speed control device. Like the speed control throttle, in other embodiments, other types of controls may serve the purpose and/or function of the second and third pedals.

The operator station may also include inputs, controls and indicators regarding the operation of the CVT that may be disposed in the powertrain to transmit power between the power source and the propulsion devices. For example, to change the direction of the machine, a forward-neutral-reverse (F-N-R) selector 136 in the form of a toggle or switch may be disposed in an appropriate accessible location, such as on the first joystick 120. Toggling of the F-N-R selector 136 may change the engagement or operation of the CVT so that the rotary output propels the machine in the forward or reverse direction, or it may disengage the CVT so that the machine is stayed in a neutral state. If the CVT is configured for a virtual gear methodology simulating a plurality of virtual gears, the operator station 112 may include a virtual gear shifter 138 in the form of a roller or slide switch. Toggling or shifting the virtual gear shifter 138 may simulate shifting between adjacent virtual gear ratios. Various other types of switches, knobs buttons, dials, levers or the like may be included. Other control functionalities may include throttle locks, ignition, work implement controls, and the like. In other embodiments, the controls and operator station may be located remotely from the machine.

To visually interact with the operator, a visual display 139 including a screen or monitor may be provided in the operator station 112. The visual display 139 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 139 may be any suitable type of display including a liquid crystal display (LCD), a cathode ray tube (CRT), a plasma display or the like. Additionally, the visual display 139 may be configured to receive input from the operator through touch-screen technology, soft buttons and so forth.

Figure 3:
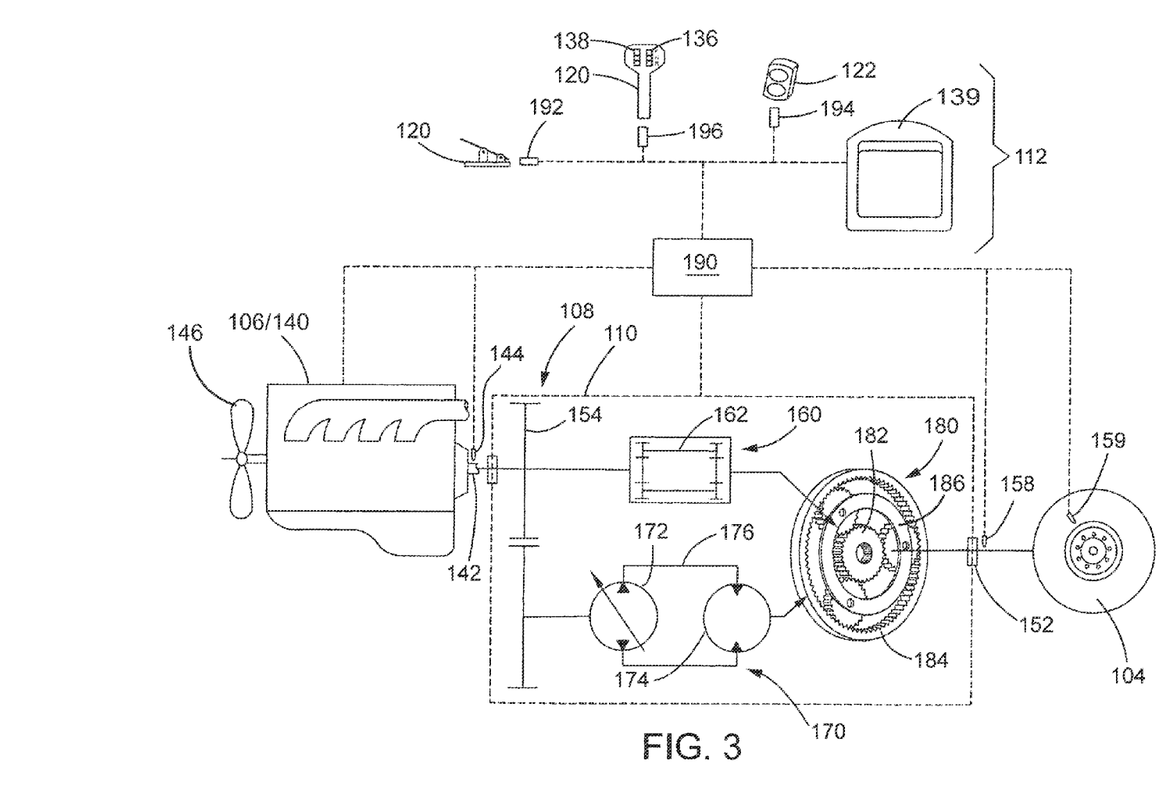
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine 140, produces rotational power that may rotate a power source output 142, such as a drive shaft, extending from the power source. The power produced by the engine 140 may be quantifiable as speed and/or torque delivered through the power source output 142. To measure the speed and/or torque, a power source sensor 144 may be associated with the power source output 142. The power source sensor 144 may be a magnetic pickup type sensor that may sense a rotating magnetic field associated with a rotating component of the power source output 142 such as a flywheel or drive shaft. In other embodiments, the power source sensor 144 may be an optical pickup sensor that optically reads a visual indication on the rotating component. The possible speed and torque outputs may in part be a function of the engine design including dimensional parameters, displacement, etc. The speed and, in a somewhat related manner, the torque produced, however, may be selectively varied to a certain extent by adjusting the operating parameters and inputs to the engine 140. The engine 140 may be operatively associated with other engine accompaniments 146 to assist its operation, such as, for example, cooling fans, pumps, turbochargers, and the like.

To adjust the speed and/or torque to a greater degree, for example, by increasing speed and inversely affecting torque, the rotational output of the power source 106 may be directed to the CVT 110 disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, may receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path 170 may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and can convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of the hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

Further, the hydrostatic power-transfer path 170 may be reversible or bi-directional meaning the fluid may flow through the fluid transfer line 176 in either direction. To facilitate bi-directionality, the hydraulic pump 172 and the hydraulic motor 174 are configured to direct and receive hydraulic fluid in either direction. Thus, the circuit established by the pump 172, the motor 174 and the fluid line 176 is reversible. In some embodiments, the bi-directionality of the hydraulic power-transfer path 170 enables a reversal of the functions of its components. In other words, the hydraulic motor 174 may act as a pump driving the hydraulic pump 172 that may function as a motor. Power transfer through the hydraulic power-transfer path 170 is thereby reversed and rotational power or motion may be back driven from the CVT input member 150 to the power source 106.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear can be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT 110 may be a purely mechanical CVT using a series of selectable, interrelated gear trains such as the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To measure the rotational output of the CVT 110, a CVT sensor 158, such as a magnet pickup sensor or an optical sensor, may be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 may terminate at a propulsion device 104, such as a rotatable wheel that engages the ground and propels the machine. Various axles, differentials and the like may facilitate the engagement of the powertrain 108 to the wheel. In the embodiment of FIG. 3, a machine speed sensor 159, such as a magnetic pickup or optical sensor, may be associated with the propulsion device. Machine speed, i.e., distance traveled per time, may be calculated by multiplying the revolutions per second of the wheel by the circumference of the wheel. In general, the machine speed should generally directly correspond to the output speed of the CVT. In other words, controlling the output of the CVT determines the machine speed. However, in some cases, the propulsion devices may be slipping, spinning out or hydroplaning with respect to the ground, in which case the measured machine speed may not equal the CVT output speed. In some embodiments, the machine speed sensor 159 or another sensor may be configured to determine if the propulsion devices are not engaging the ground appropriately.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, control maps, data tables, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and may also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave or any other medium from which a computer or processor may read. Although in FIG. 3, the controller 190 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the operator station 112 and the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine with respect to the ground, the controller 190 may communicate with a first pedal sensor 192 associated with and registering articulation of the first pedal 130 intended as a throttle register. The first pedal sensor 192 may generate an operator input signal upon modulation of the first pedal and communicate the operator input signal to the controller 190 that may accordingly adjust operation of one or more components in the powertrain 108 to increase or decrease machine speed and/or output. The controller 190 may also communicate with a second pedal sensor 194 associated with the second pedal 132 that may function as a clutch control device and with a third pedal sensor 196 associated with the third pedal 134 that may function as a brake. The controller 190 may also communicate with the F-N-R selector 136 to register an input commanding a change in direction of the machine and may communicate with the virtual gear shifter 138 to register an input commanding a shift of the virtual gears. The controller 190 may also be in communication with the visual display 139 and may send and receive information with the display.

To further assist operation, the controller may also communicate with other sensors or monitors disposed about the machine. For example, the controller 190 may communicate with the power source sensor 144 so that the controller may determine the speed or characteristics of the power source output. The controller 190 may also communicate with the CVT sensor 158 to monitor the output of the CVT. To determine the machine speed, the controller may communicate directly with the machine speed sensor 192 associated with the propulsion devices 104. The foregoing description is exemplary and the controller may communicate with other sensors measuring other aspects of the operation of the machine.

Figure 4:
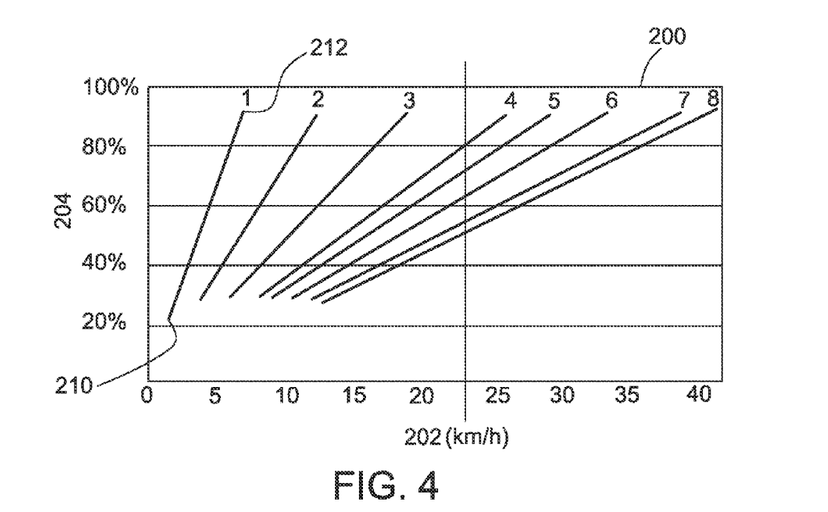
FIG. 4 is an illustration of a control map or chart correlating machine speed to a plurality of virtual gear ratios and to modulation of a pedal.

As mentioned above, the controller may regulate the output speed and/or torque of the CVT within discrete ranges by associating those ranges with a plurality of operator-selectable virtual gear ratios. Any suitable number of virtual gear ratios may be utilized including fractions or increments of discrete virtual gear ratios. The virtual gear ratios may be associated with the forward and/or reverse directions of the machine. Referring to FIG. 4, there is illustrated a virtual gear map 200 for operating a CVT utilizing a series of virtual gear ratios. For example, the controller may be programmed with a virtual gear map 200 that reflects the relation between machine performance and the plurality of virtual gear ratios that, in the illustrated example, may include gears (1) through (8). The virtual gear ratios are represented as angled lines and each virtual gear ratio has an associated range of virtual gear speeds between a minimum virtual gear speed 210 at the lower end of the line and a maximum virtual gear speed 212 at the higher end. The virtual gear map 200 correlates virtual gear ratios (1)-(8) including the minimum and maximum virtual gear speeds 210, 214 to the available CVT speeds. The CVT speeds in turn may correspond directly to the machine speed along the X-axis 202. For example, in the illustrated embodiment, virtual gear ratio (1) may have a minimum virtual gear speed 210 that corresponds to an intended machine speed of about 2 kilometers per hour (kph) and may have a maximum virtual gear speed 212 that corresponds to an intended machine speed of about 5 kph. Virtual gear ratio (2) may correspond to an intended machine speed of between about 4 and 12 kph. Virtual gear ratio (8) may have a maximum virtual gear speed corresponding to an intended maximum speed of the machine, e.g., 40 kph.

Thus, the plurality of virtual gear ratios (1)-(8) provides a series of increasing higher and overlapping available speed ranges. The operator may smoothly shift between adjacent virtual gear ratios due to the overlapping speed ranges. Moreover, in various embodiments, the speed ranges for each virtual gear ratio may generally correspond to known travel speeds of conventional gear-based transmissions. To alter the machine speed within the range available for each virtual gear ratio, the virtual gear map 200 may chart the operator input signal, e.g., modulation of the throttle or first pedal, as a percentage along the Y-axis 204. As the first pedal is depressed in increasing degrees of modulation, the output speed of the CVT may increase by following the upward sloping lines associated with each virtual gear ratio (1)-(8). Accordingly, the operator may shift upward through the plurality of virtual gear ratios to direct the CVT and thus the machine to produce increasing speeds and a wider range of speeds.

Referring to FIG. 3, the operator also may attempt to slow or decrease the speed of the machine by initiating or commanding one or more operational changes using the controls provided in the operator station 112. For example, the operator may release the first pedal 130 after bringing the machine to a desired speed indicating that further acceleration is no longer needed. Typically, release of a throttle pedal may be accompanied by a coasting sensation in which the weight of the machine and/or friction with the ground may gradually decrease the speed of the machine. If the operator does not depress the first pedal 130 again, the machine may eventually decelerate to a stop or a minimal, low-idle speed. To decrease the speed more rapidly and/or to hold the machine at a standstill, the operator may depress the third pedal 134 designated as the brake pedal. In the embodiments in which the CVT 110 and the controller 190 are configured to simulate a plurality of virtual gear ratios, the operator may also attempt to slow or decelerate the machine by downshifting to lower virtual gear ratios associated with lower machine speeds by toggling the virtual gear shifter 138. To change the relative forward or rearward travel direction of the machine, the operator may also actuate the F-N-R selector 136. In some embodiments, especially those utilizing a CVT, a change in relative direction may be done abruptly while the machine is traveling at relatively high speeds which may result in jerking or lurching of the machine. Operational changes of the foregoing types may also be considered deceleration events because they may involve deceleration or decreasing the speed of the machine. The foregoing examples of operational changes and deceleration events are illustrative only and other changes and events may be included within the scope of the disclosure.

To assist in slowing or decelerating the vehicle during an operational change or deceleration event, the powertrain 108 may be adapted to direct a retarding power back to the power source 106. Under conditions appropriate for retarding, the velocity of the machine may be greater than desired. The machine in such circumstances may be considered as traveling with excess momentum or potential energy. The excess energy in the form of speed or torque may be captured through the driven elements coupled to the powertrain 108, such as the propulsion device 104, and may be redirected back to power source 106. For example, if the propulsion device 104 is a wheel, its rotational motion may be captured and converted into a rotational power that is transmitted through the CVT 110 and is applied to the power source output 142 of the power source 106. The powertrain 108 is therefore functioning in a reversed or backwards manner by transferring more rotary power from the propulsion devices 104 to the power source 106 than it would if transferring rotary output from the power source to the propulsion device. The reversible nature of the hydrostatic power-transfer path 170 of the CVT 110 helps facilitate redirection and transmission of the retarding power.

The retarding power may therefore back-drive the power source 106, in particular, by rotating the power source output 142, such as the crankshaft at a faster rate than power source output is being driven in the same direction by the power source. In other words, the net torque or power delivered into the power source 106 from the CVT 110 may be greater than the power being generated in the power source. Under such conditions, the rotational speed of the power source 106 will typically increase due to the net power transfer into it. The delivered retarding power may be dissipated within the power source 106, for example, by overcoming frictional forces between pistons and cylinders resulting in the generation of heat. Additionally, a portion of the retarding power may be directed onto one or more other engine accompaniments 146, such as cooling fans, pumps and the like, associated with the power source 106. Furthermore, in some embodiments, fuel to the power source 106 may be shut off or restricted so that power generation due to the combustion process is reduced. The power source may therefore consume and dissipate a larger amount of the retarding power returned.

One beneficial consequence of directing a retarding power from the propulsion devices 104 back to the power source 106 is that the machine 100 may decelerate or lose velocity since the net power transfer is now directed away from the propulsion devices. Accordingly, to assist in slowing the machine during an operation change or deceleration event as described above, the powertrain 108 and/or the CVT 110 may reconfigure themselves to capture and transmit retarding power from the propulsion devices. The controller 190 may include various computer-readable maps, charts, and control strategies to facilitate redirection or transmission of the retarding power.

In an embodiment, the controller 190 may also be configured to limit the retarding power transmitted. Specifically, the limits may be set so that the amount of retarding power transmitted is suitable for the operational change or deceleration event occurring. The controller may further be able to vary or adjust the retarding power limits between the different types of events. Different values for the limits may be included in one or more maps, charts or tables stored in memory associated with the controller or otherwise accessible by the controller. For example, referring to FIG. 5, there is illustrated a possible lookup table 250 associating the different operational changes or deceleration events 252 as columns with different possible limits 254 in rows. As a specific example, the lookup table 250 may include a column for a throttle release event 260, a column for a direction change event 262, and a column for a virtual gear shift event 264.

Figure 5:
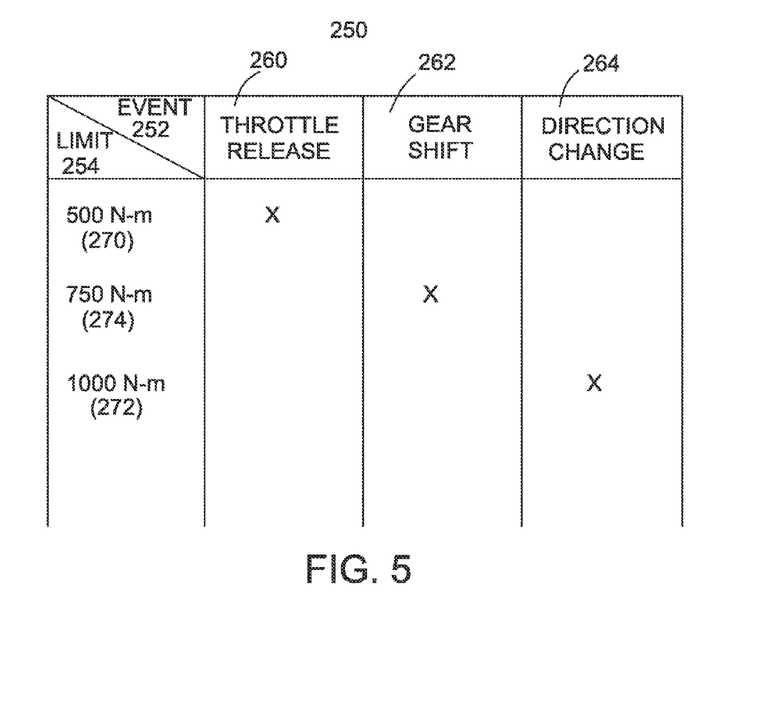
FIG. 5 is a graphical illustration of an embodiment of a lookup table for correlating deceleration events with retarding power limits.

The magnitude of the limits 254 may be specifically or uniquely suited for each type of deceleration event 252. For example, the lookup table may include a first limit 270 associated with a relatively low limit or ceiling on the amount of transferable retarding power. In other words, the first limit 270 may prevent retarding power in any amount greater than, e.g., 500 Newton-meters from being transferred or redirected from the propulsion devices or other driven devices. The lookup table 250 may also include a second limit 272 that is relatively higher or sets a higher ceiling on retarding power. For example, the second limit may be set at 1000 Newton-meters. Accordingly, the amount of transferable retarding power that is available under the second limit 272 exceeds the amount available under the first limit 270. The lookup table 250 may also include a third limit 274 having a value in between the first limit 270 and the second limit 272, such as 750 Newton-meters. The table may include any suitable number of limits as may be necessary for the different deceleration events.

Referring to FIGS. 3 and 5, if the first pedal 130 is released, it may signal that the operator desires the machine to gradually decelerate or coast to a stop. The controller 190 utilizing the lookup table 250 may register release of the first pedal as the throttle release event 260 and associate that event with the first limit 270, e.g., 500 Newton-meters. The controller 190 may limit the power or torque transferred back from the propulsion devices 104 in accordance with this value. As a different example, the F-N-R selector 136 may be activated to command a direction shift in the travel of the machine 100, e.g., from forward to reverse or vice versa. This type of operational change or deceleration event may be associated with an abrupt or sudden deceleration or jerking of the machine, especially if the machine had been previously traveling in the opposite direction. Accordingly, the controller 190 and the lookup table 250 may associate the direction change event 262 with the second limit 272 having the relatively larger value of a 1000 Newton-meters and accordingly apply that larger limit to the CVT 110. As a further example, the operator may actuate the virtual gear shifter 138 indicating a shift from a first virtual gear ratio to a second virtual gear ratio. As such, the lookup table 250 may apply the third limit 274 associated with the mid-range retarding power of 750 Newton-meters.

While the first, second, and third limits 270, 272, 274 described in the example of the lookup table 250 are precise numbers, it should be appreciated that in other embodiments, the limits may be presented as other numerical value such as ranges, percentages or the like. Additionally, the lookup table 250 may include sub-limits or associate multiple limits with each type of deceleration event 252. Accordingly, different limits may apply to each type of event depending upon various operating parameters or settings. In other embodiments, a chart or map may be used that includes a limit curve that changes value for different decelerations events. Further, the limit curve may be movable or adjustable based on the events, parameters and/or settings.

INDUSTRIAL APPLICABILITY

Figure 6:
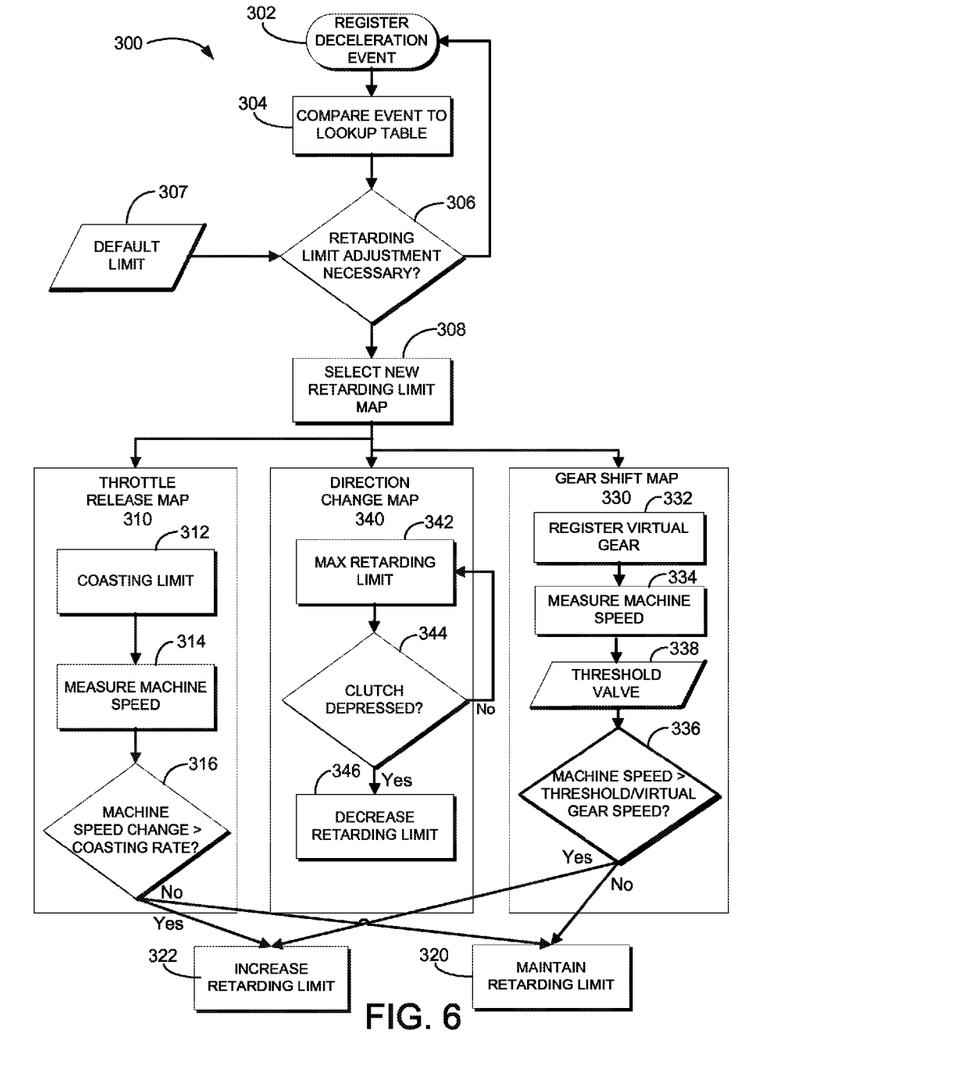
FIG. 6 is a flowchart representing a possible routine or process for directing a retarding power to a power source from a CVT.

Referring to FIG. 6, there is illustrated an example of a flowchart 300 for carrying out a process or routine in accordance with an aspect of the disclosure. The steps of the flowchart 300 may be carried out by the controller in conjunction with controls, inputs and sensors disposed about the machine. The flowchart 300 may be initiated in a registration step 302 that registers a deceleration event. The deceleration event may result from operator actuation of the operator controls and/or inputs 114 in the operator station 112 of FIG. 3, such as articulation of the pedals 130-134 or toggling of the F-N-R selector 136 or virtual gear shifter 138, in order to command an operational change with respect to the machine. In a comparison step 304, the flowchart 300 may compare the deceleration event registered in the registration step 302 to a lookup table, for example, similar to the lookup table 250 in FIG. 5, to determine the appropriate limit or limits required for the type of deceleration event registered. A possible advantage of referring the deceleration event to a lookup table having a plurality of limits is that the limits may be set to provide retarding power specifically matched to the type of event initiated. Accordingly, the reaction of the CVT and/or powertrain may be regulated within limits configured or tailored to meet operator expectations regarding the initiated event.

Using the information from the lookup table 250, the flowchart 300 may conduct a determination step 306 to determine if retarding limits should be adjusted. For example, in an embodiment, a default limit 307 may be applied to control operation of the powertrain 108 and CVT 110 that accordingly restricts the retarding power to a level suitable for some but not all deceleration events. In an embodiment, the default limit 307 may correspond to the first retarding power limit 270 from the lookup table 250 in FIG. 5. The determination step 306 may determine if the default limit 307 requires adjustment for the registered deceleration event. In other embodiments, the determination step 306 may compare the information obtained from the comparison step 304 with the present settings of the CVT 110 and/or powertrain 108, rather than with a specific default limit 307. If determination step 306 determines that adjustment of the retarding limits is not required, the flowchart may return to the registration step 302. If, however, the determination step 306 determines that that the limits should be adjusted, the flowchart 300 may proceed to a selection step 308 in which an appropriate map, subroutine or module is selected for the registered operational change or deceleration event in order to regulate the powertrain 108 and CVT 110.

For example, the controller 190 may include or have access to a plurality of such maps or modules that may be adapted to provide retarding in amounts or within limits suited for particular deceleration events. For instance, if the operator releases the first pedal 130 or a similar machine speed control device functioning as the throttle, the selection step 308 may select a throttle release map 310. The throttle release map 310 may implement a coasting limit 312 that limits the amount of retarding power directed from the propulsion devices 104 back through the powertrain 108 to the power source 106. The amount may be determined or calculated to produce a sensation that the machine is gradually coasting towards a full stop to simulate the coasting sensation that may accompany release of a throttle in machines equipped with conventional gear-based transmissions. Accordingly, the coasting limit 312 may be relatively low so that only small levels of retarding power are returned to or dissipated in the powertrain 108 and/or power source 106. In an embodiment, the coasting limit 312 may be equivalent to the default limit 307 described above.

In a further embodiment, to determine if the machine is decelerating at a sufficient rate, the throttle release map 310 may assess the actual machine speed during retarding. In a speed measurement step 314, the throttle release map 310 measures the machine speed, either directly from the propulsion devices 104 or indirectly by measuring the output speed of the CVT 110, and passes that value onto a coasting comparison step 316 where machine speed or, more precisely, the machine deceleration, is compared to a predetermined deceleration rate or a coasting rate. The deceleration or coasting rate may be stored in a deceleration map associated with the controller. If the change in machine speed or the deceleration of the machine speed is in accordance with the coasting rate, the throttle release map 310 may issue a maintain limit instruction 320 that controls or maintains the prevailing retarding limit. If, however, the change in machine speed or deceleration exceeds or does not correspond with the predetermined coasting rate, the throttle release map 310 may issue an increase limit instruction 322 that adjusts regulation of the powertrain 108 and/or the CVT 110 to increase the retarding limits and allow a greater amount of retarding power to be redirected and dissipated to decrease machine speed. As may be appreciated, the throttle release map 310 may re-perform the measurement step 314 and coasting comparison step 316 to continually reassess whether actual machine speed complies with the coasting rate.

If the operator instead actuated the virtual gear shifter 138, the selection step 308 may select and implement a gear shift map 330. The gear shift map 330 may perform a virtual gear registration step 332 to determine what virtual gear ratio has been selected from among the plurality of virtual gear ratios that, in some embodiments, may be associated with the CVT 110. Each virtual gear ratio (1)-(8) may be associated with a plurality of speed ranges such as indicated in FIG. 4 including the minimum virtual gear speeds 210 and the maximum virtual gear speeds 212. The gear shift map 330 may also perform a speed measurement step 334 to assess the speed of the machine with respect to the ground. To determine the limits on the retarding power transmitted, a gear shift comparison step 336 compares the machine speed with information regarding the available speed range associated with the selected virtual gear ratio.

For example, the comparison step 336 may compare the actual machine speed from the speed measurement step 332 with a target speed associated with the selected virtual gear ratio determined by the virtual gear registration step 332. The comparison may involve determining the difference between the machine speed and the target speed associated with the selected virtual gear ratio. The difference can be compared to a predetermined threshold value 338 that is programmed in to the gear shift map 330 or may be adjustably selected by the operator. By way of example, immediately after a downshift, the machine speed may be 10 kph, the target speed may be 5 kph, and the threshold value 338 may be 2 kph. In this example, the comparison step 336 would determine an error because the difference between machine speed and target speed (10 kph−5 kph=5 kph) is greater than the threshold value (5 kph>2 kph). The comparison step 336 would therefore command an increased retarding limit. If the difference is below the threshold value 338, the gear shift may 330 may instead maintain the retarding limit 320.

In another embodiment, the comparison step 336 may compare the measured machine speed is within the range of speeds for the selected virtual gear ratio. If the machine speed is within the range, indicating a smooth gear shifting event, the gear shift map 330 may issue or implement the maintain limit instruction 320 and maintain the prevailing retarding characteristics. If, however, the machine speed meets or exceeds the maximum virtual gear speed of the available speed range associated with the selected virtual gear ratio, the gear shift map 330 may issue the increase limit instruction 320 to increase the retarding torque limit and transmit sufficient retarding power to more rapidly decelerate the machine. In an embodiment, the increase limit instruction 320 may correspond to the third retarding power limit 274 in the lookup table 250 of FIG. 5. This may produce sensations similar to those associated with an excessive or overly hard transmission downshift in a gear-based transmission.

In an embodiment, the gear shift map 330 may return to applying the default limit 307 after a predetermined period of time. Additionally, the measured machine speed may be continuously monitored and compared with the allowable speed ranges for the selected virtual gear ratio. If the machine speed falls back within the allowable range, the flowchart may return to the default limit 307. By returning to the default limit 307, which may set a relatively low ceiling on the amount of retarding power transferable through the powertrain and to the power source, the described process may help protect those components from possible damage that could be caused if large quantities or spikes in retarding power were suddenly transferred.

If the operator intends to change direction of the machine by actuating the F-N-R selector, the selection step 308 may access and implement a direction change map 340. The direction change map 340 sets the retarding power limit to a second limit 342, which may be a relative maximum limit, allowing a larger or maximum amount of retarding power to be redirected from the propulsion devices 104 back to the power source 106. For example, the second limit 342 may be selected to increase the rotational speed of the power source to RPMs at or near the maximum operational limits, or the "red-line" speed, of the power source. In an embodiment, the second limit 342 may correspond to the second retarding power limit 272 in the lookup table 250 of FIG. 5. Accordingly, if the operator abruptly changes direction of the machine, e.g., from forward to reverse, the second limit 342 may rapidly decelerate the machine before it begins to accelerate in the opposite direction. This may produce a sudden jerking or lurching motion that may be associated with a directional change. However, in some instances, the operator may attempt to smooth the transition by disengaging a physical clutch associated with the powertrain. Disengagement of the clutch results in slipping between the clutch components in a manner that dissipates some of the energy from the direction change.

Accordingly, to simulate disengaging of a clutch in the disclosed embodiments, the operator may depress the second pedal 132 simultaneously with changing the direction using the F-N-R selector 136 to facilitate this smoothing feature. Accordingly, the direction change map 340 may include a clutch registration step 344 to sense articulation of the second pedal 132 or other clutch control device representing a command or direction to activate or simulate clutch slippage. If the articulation of the second pedal 132 is registered, the direction change map 340 may issue or direct a decrease limit instruction 346 to lower the maximum or the second retarding power limit 342 to reduce the amount of retarding torque transmitted thereby resulting in a smoother transition during the direction change.

Accordingly, the flowchart is capable of selecting or changing retarding power limits according to the different types of deceleration events or operational changes. In those embodiments utilizing a default limit, the flowchart may return to regulating the CVT in accordance with the default limit after the deceleration event occurs. The various limits may be determined empirically to simulate the response of machines using gear-based transmissions. Values for the limits can be set at any suitable amount and, in some embodiments, may be adjustable according to operator preference. In other embodiments, different limits or different deceleration events may be included, such as may be associated with a braking event.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of controlling speed of a machine having a continuously variable transmission (CVT) and a power source operatively coupled in a powertrain; the method comprising:
regulating operation of the CVT with a retarding power limit that limits a retarding power transferable from the powertrain to the power source;
registering an operator input signal indicative of a deceleration event;
comparing the deceleration event to a lookup table to determine if the retarding power limit should be adjusted; and
adjusting the retarding power limit in accordance with the step of comparing.

2. The method of claim 1, wherein the deceleration event is a release of a machine speed control device.

3. The method of claim 2, further comprising measuring a machine speed of the machine; comparing the machine speed with a deceleration map having a deceleration rate; and increasing the retarding power limit if the machine speed exceeds the deceleration rate.

4. The method of claim 3, wherein the step adjusting the retarding power limit in accordance with the step of comparing results in maintaining the retarding power limit.

5. The method of claim 1, wherein the CVT is associated with a plurality of virtual gear ratios and the deceleration event includes downshifting from a first virtual gear ratio to a second virtual gear ratio.

6. The method of claim 5, wherein each of the plurality of virtual gear ratios includes a range of virtual gear speeds between a minimum virtual gear speed and a maximum virtual gear speed.

7. The method of claim 6, further comprising measuring a machine speed; comparing the machine speed to a target speed associated with the second virtual gear ratio; and increasing the retarding power limit if the machine speed meets or exceeds the target speed.

8. The method of claim 6, further comprising measuring a machine speed, comparing the machine speed to a target speed associated with the second virtual gear ratio; and maintaining the retarding power limit if the machine speed is below the target speed.

9. The method of claim 1, wherein the deceleration event is a direction change command.

10. The method of claim 9, further comprising setting the retarding power limit to a second retarding power limit that is larger than the retarding power limit initially.

11. The method of claim 10, comprising monitoring a second operator input signal indicative of activation of a clutch control device, and reducing the second retarding power limit if the clutch control device is activated.

12. A machine comprising:
a power source;
a continuously variable transmission (CVT) operatively coupled to the power source;
an operator input device for registering an operator input signal indicative of a deceleration event;
a controller communicating with the CVT and the operator input device, the controller including a first retarding power limit and a second retarding power limit limiting a retarding power directed by the CVT to the power source, the controller further including a lookup table for selecting either the first retarding power limit or the second retarding power limit based on the deceleration event.

13. The machine of claim 12, wherein the second retarding power limit exceeds the first retarding power limit.

14. The machine of claim 13, further comprising a third retarding power limit in between the first retarding power limit and the second retarding power limit.

15. The machine of claim 13, wherein the deceleration event is selected from the group consisting of a downshifting a virtual gear ratio; a direction change of the machine; and a release of a machine speed control device.

16. The machine of claim 15, wherein the release of the machine speed control device translates to the first retarding power limit, the direction change of the machine corresponds to the second retarding power limit, and the downshifting of a virtual gear ratio relates to the third retarding power limit.

17. A method of controlling speed of a machine having a power source and a continuously variable transmission (CVT) operatively coupled in a powertrain; the method comprising:
controlling operation of the powertrain by selective use of a first retarding power limit, a second retarding power limit, and a third retarding power limit, the first retarding power limit, the second retarding power limit, and the third retarding power limit limiting transmission of a retarding power in the powertrain;

registering release of a machine speed control input device; and selecting and applying the first retarding power limit to limit transmission of the retarding power.

18. The method of claim 17, wherein the third retarding power limit is relatively higher than the first retarding power limit and relatively lower than the second retarding power limit.

19. The method of claim 18, further comprising registering a downshift from a first virtual gear ratio associated with the CVT to a second virtual gear ratio associated with the CVT; and selecting the third retarding power limit to limit transmission of the retarding power.

20. The method of claim 19, further comprising registering a direction change command and selecting the second retarding power limit to limit transmission of the retarding power.

* * * * *